(12) United States Patent
Juliato et al.

(10) Patent No.: US 12,184,668 B2
(45) Date of Patent: Dec. 31, 2024

(54) POST-GATEWAY BUS-OFF ATTACK MITIGATION

(71) Applicant: Intel Corporation, Santa Clara, CA (US)

(72) Inventors: Marcio Juliato, Portland, OR (US); Shabbir Ahmed, Beaverton, OR (US); Christopher Gutierrez, Hillsboro, OR (US); Vuk Lesi, Cornelius, OR (US); Manoj Sastry, Portland, OR (US); Qian Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 17/356,033

(22) Filed: Jun. 23, 2021

(65) Prior Publication Data

US 2021/0320933 A1    Oct. 14, 2021

(51) Int. Cl.
- *H04L 29/06* (2006.01)
- *H04L 9/40* (2022.01)
- *H04L 12/40* (2006.01)
- *H04L 12/66* (2006.01)

(52) U.S. Cl.
CPC .... *H04L 63/1416* (2013.01); *H04L 12/40104* (2013.01); *H04L 12/66* (2013.01); *H04L 63/1425* (2013.01); *H04L 63/1483* (2013.01); *H04L 2012/40273* (2013.01)

(58) Field of Classification Search
CPC ........... H04L 63/1416; H04L 12/40104; H04L 12/66; H04L 63/1425; H04L 63/1483; H04L 2012/40273
See application file for complete search history.

(56) References Cited

U.S. PATENT DOCUMENTS

| | | | |
|---|---|---|---|
| 2006/0182187 A1* | 8/2006 | Likovich | H04L 1/22 375/257 |
| 2008/0186870 A1* | 8/2008 | Butts | H04L 43/0847 370/252 |
| 2012/0191888 A1 | 7/2012 | Schachtner et al. | |
| 2016/0021127 A1* | 1/2016 | Yan | H04W 12/08 726/23 |
| 2017/0171159 A1* | 6/2017 | Kumar | G06F 9/45558 |
| 2017/0286675 A1* | 10/2017 | Shin | H04L 63/1416 |

(Continued)

FOREIGN PATENT DOCUMENTS

| | | | | |
|---|---|---|---|---|
| DE | 112021002835 T5 * | 5/2023 | | |
| JP | 6741559 B2 * | 8/2020 | ........... | B60R 16/023 |
| WO | 2020168333 A1 | 8/2020 | | |

OTHER PUBLICATIONS

International Search Report and Written Opinion for the International Patent Application No. PCT/US2022/021898, mailed Jul. 6, 2022, 8 pages.

*Primary Examiner* — Khalid M Almaghayreh
(74) *Attorney, Agent, or Firm* — KDW Firm PLLC (57) ABSTRACT

Systems, apparatuses, and methods to identify bus-off and masquerade attacks against electronic control units (ECUs) transmitting on a communication bus from behind a gateway coupled to the communication bus are described. The disclosure further describes systems, apparatuses, and methods to mitigate against bus-off attacks made against an ECU coupled to a communication bus through a gateway. Other embodiments are described and claimed.

24 Claims, 8 Drawing Sheets

(56) References Cited

U.S. PATENT DOCUMENTS

| | | | |
|---|---|---|---|
| 2018/0025156 A1* | 1/2018 | Dagan | H04L 63/1483 |
| | | | 713/161 |
| 2018/0167360 A1* | 6/2018 | Maeda | H04L 63/0209 |
| 2019/0052654 A1 | 2/2019 | Juliato et al. | |
| 2019/0149561 A1* | 5/2019 | Maeda | B60R 16/0232 |
| | | | 726/23 |
| 2019/0207950 A1 | 7/2019 | Mohammed et al. | |
| 2020/0213351 A1* | 7/2020 | Shin | H04L 12/40 |
| 2020/0372148 A1 | 11/2020 | Alban et al. | |
| 2021/0144124 A1* | 5/2021 | Maeda | H04L 12/44 |
| 2021/0176246 A1* | 6/2021 | Chapman | H04L 12/40013 |
| 2021/0203682 A1* | 7/2021 | Bajpai | H04L 63/0428 |
| 2021/0320933 A1 | 10/2021 | Juliato et al. | |
| 2022/0035916 A1* | 2/2022 | Lee | H04L 12/40013 |

* cited by examiner

POST-GATEWAY BUS-OFF ATTACK MITIGATION

BACKGROUND

Communication networks are implemented in a variety of modern systems, such as, automotive, bus, train, industrial vehicle, agricultural vehicle, ship, aircraft, spacecraft, manufacturing, industrial, health devices/equipment, retail, or the like. Often, networking protocols are used to facilitate information communication between components in the system. For example, an in-vehicle network (IVN), like a CAN bus, can be used to provide a message-based protocol facilitating communication between electronic control units (e.g., microcontrollers, sensors, actuators, etc.). However, the increasingly high number of electronic control units communicating on such networks can expose the systems to various types of security risks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments of the present disclosure provide for mitigating "bus-off attacks" made against electronic control units (ECUs) transmitting messages on a communication bus. Further, the present disclosure provides to detect masquerading attacks. In particular, the present disclosure provides a post-gateway security system arranged to mitigate the risk of bus-off attacks as well as detect masquerading attacks. As used herein, a bus-off attack is where an attacker attempts to exploit fault containment mechanisms of ECUs transmitting messages on a communication bus. The attacker attempts to force an ECU to initiate it's fault containment protocol and disconnect itself from the bus. A masquerading attack is where the attacker sends messages as if they originated from the target ECU.

For example, an attacker can inject messages onto the communication bus in an attempt to cause controlled collisions with messages transmitted by the target ECU. The collisions may cause the target ECU to accumulate errors, and when enough errors are accumulated to initiate a fault containment mechanism resulting in the target ECU disconnecting from the bus. In essence, the target ECU is made to think it is malfunctioning and therefore should disconnect from the communication bus to prevent impact to the remaining of the system. As a practical example, an attacker could use an infotainment system of a vehicle to inject messages onto an in-vehicle network coupled to the infotainment system. The injected messages can be timed to collide with messages from a target ECU (e.g., automated braking, lane keeping assist, or the like) in the hope that the target ECU will disconnect itself from the bus based on a repeated number these message collisions. Once the target ECU disconnects from the bus it is unable to perform its function (e.g., automated braking, steering for lane keeping, or the like).

Continuing with the vehicle example, modern vehicles have many (often hundreds) of ECUs. These ECUs are communicatively coupled via an in-vehicle network (IVN), such as, as a CAN bus. There are multiple ECUs for engine control, transmission, airbags, antilock brakes, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles. Attackers can exploit vulnerabilities in a number of these ECUs to inject messages onto a bus and attempt to "bus-off" target ECUs.

Additionally, many modern vehicles can include auxiliary control systems that couple to the ECUs and in-vehicle network via a gateway. Attackers can attempt to force the auxiliary control system or the gateway off the bus in a similar manner as described above. The present disclosure is directed towards mitigating such "bus-off" attacks of ECUs and gateways coupled via a communication bus. These ECUs, gateways, and communication networks can be implemented in a variety of contexts, such as, for example, industrial networks, vehicular networks, manufacturing networks, retail operation networks, warehousing networks, or the like. Although vehicular networks are often used in this description as an example, the claims are not limited to in-vehicle networks.

Figure 1:
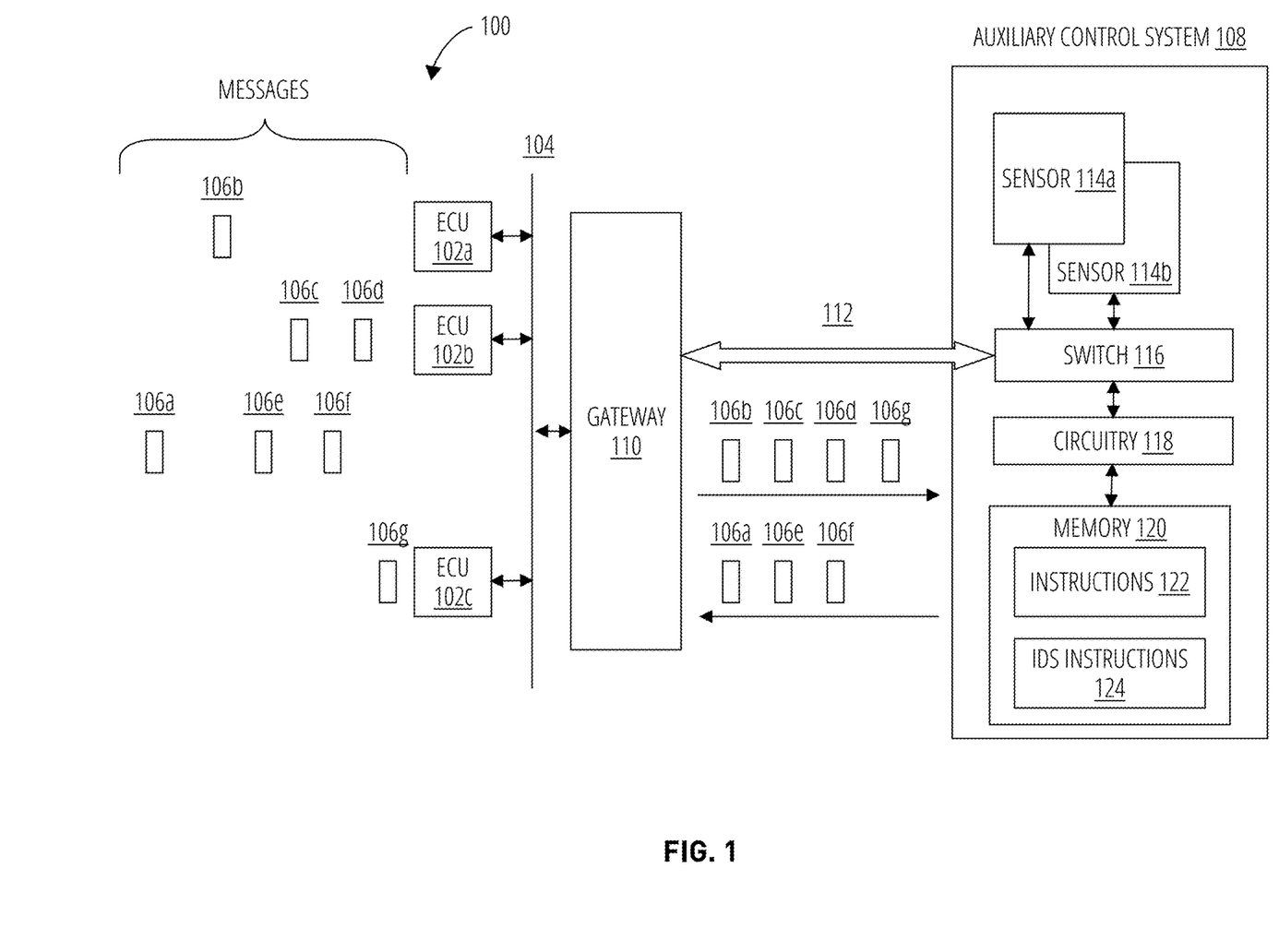
FIG. 1 illustrates an aspect of the subject matter in accordance with one embodiment.

FIG. 1 illustrates an example system 100, which can be implemented in a vehicle, such as, for example, an automobile, a motorcycle, an airplane, a boat, a personal watercraft, an all-terrain vehicle, or the like. As noted above, the present disclosure is applicable to other systems, besides vehicles, such as, for example, aerospace, industrial, manufacturing, retail, or the like.

System 100 includes a number of electronic control units ECUs 102a, 102b, and 102c. System 100 further includes a communication bus 104, which can be a CAN bus, a FlexRay bus, a CAN FD bus, an automotive ethernet bus, or a local interconnected network (LIN) bus. Additionally, where implemented in contexts outside of the automotive space, the communication bus 104 can be a network bus adapted to the particular implementation, such as, for example, a communication network for manufacturing equipment, or the like.

In general, each of ECUs 102a, 102b, and ECU 102c include circuitry arranged to generate messages and transmit the messages onto communication bus 104 and/or consume messages from communication bus 104. The depicted ECUs (e.g., ECUs 102a, ECU 102b, and ECU 102c) can be any of a variety of devices, such as, for example, sensor devices, actuator devices, microprocessor control devices, or the like.

For example, the ECUs include circuitry arranged to manipulate voltage levels on communication bus 104 to communicate messages via the communication bus 104. As depicted, system 100 includes three (3) ECUs. This is done for clarity of presentation. However, in practice (e.g., in a modern automobile, in a factory, in a warehouse, or the like) hundreds of ECUs may be provided in system 100.

As noted, ECUs are arranged to generate and/or consume messages, where the messages can include data or commands. Specifically, ECU 102a, ECU 102b, and ECU 102c can convey messages via communication bus 104. As such, messages are depicted on communication bus 104. In particular, this figure depicts a number of messages, such as, message 106a, 106b, 106c, 106d, 106e, 106f, and 106g. The number of messages is depicted for purposes of clarity and ease of explanation.

The ECUs in system 100 contain a fault containment system (not depicted) that can cause the ECU to disconnect itself from the communication bus 104 in the event that the ECU detects a problem. For example, during operation the fault containment system can cause an ECU to disconnect from communication bus 104. As a specific example, the fault containment system of ECU 102a can be configured to detect and accumulate a tally of errors related to messages transmitted by ECU 102a. The fault containment system can further be configured to cause ECU 102a to disconnect from the communication bus 104 based on the number of message transmission errors. As such, an attacker can take advantage of these fault containment systems and attempt to force ECUs (e.g., ECU 102a, or the like) off communication bus 104. As described above, this is a bus-off attack.

System 100 can further include an auxiliary control system 108. Auxiliary control system 108 can be any of a variety of control systems, such as, for example, autonomous vehicle control systems, or the like. In some examples, auxiliary control system 108 may not have direct access to the communication bus 104. In such examples, auxiliary control system 108 can be coupled to communication bus 104 via a gateway 110 and communication channel 112. Gateway 110 is coupled to communication bus 104 and translates messages communicated on communication bus 104 to convey them to auxiliary control system 108 via communication channel 112 or to translate messages from auxiliary control system 108 to communicate them onto communication bus 104. Said differently, gateway 110 includes circuitry (not shown) and/or memory comprising instructions and associated processing circuitry (also not shown) to receive messages from auxiliary control system 108 and translate messages for communication onto communication bus 104 and also to receive messages from communication bus 104 and translate them for communication to auxiliary control system 108. Communication channel 112 can be any of a variety of communication mediums, such as, for example, an Ethernet link, or the like.

It is to be appreciated that conventional techniques to mitigate against bus-off attacks are incompatible with system 100 as auxiliary control system 108 does not have direct access to the communication bus 104. Accordingly, the present disclosure provides techniques to mitigate against bus-off attacks without direct access to the communication bus 104, such as in the case of auxiliary control system 108 and gateway 110.

Auxiliary control system 108 includes sensors 114a and 114b, switch 116, circuitry 118, and memory 120. Circuitry 118 can include any of a variety of processing circuitry and/or processors, such as, for example, commercial central processing units, application specific integrated circuits, microcontrollers, or the like. Circuitry 118 can be a microprocessor or a commercial processor and can include one or multiple processing core(s) and can also include cache memory.

Memory 120 can be based on any of a wide variety of information storage technologies. For example, memory 120 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 120 can include memory storage devices.

Memory 120 includes Instructions 122, which can be executed by circuitry 118. Instructions 122, when executed by circuitry 118 can cause auxiliary control system 108 to receive messages from gateway 110 and also generate messages for communication onto communication bus 104 via gateway 110. In some examples, auxiliary control system 108 can generate messages responsive to received messages and/or responsive to output from sensors 114a and/or sensor 114b. For example, this figure depicts messages message 106b, 106c, 106d, and 106g being received by auxiliary control system 108 and messages 106a, 106e, and 106f being generated by auxiliary control system 108.

Memory 120 further includes intrusion detection system (IDS) instructions, such as, IDS instructions 124. IDS instructions 124 can be executed by circuitry 118 to detect and implement counter measures to attacks made against auxiliary control system 108 (e.g., bus-off attacks, masquerading attacks, or the like).

Figure 2A:
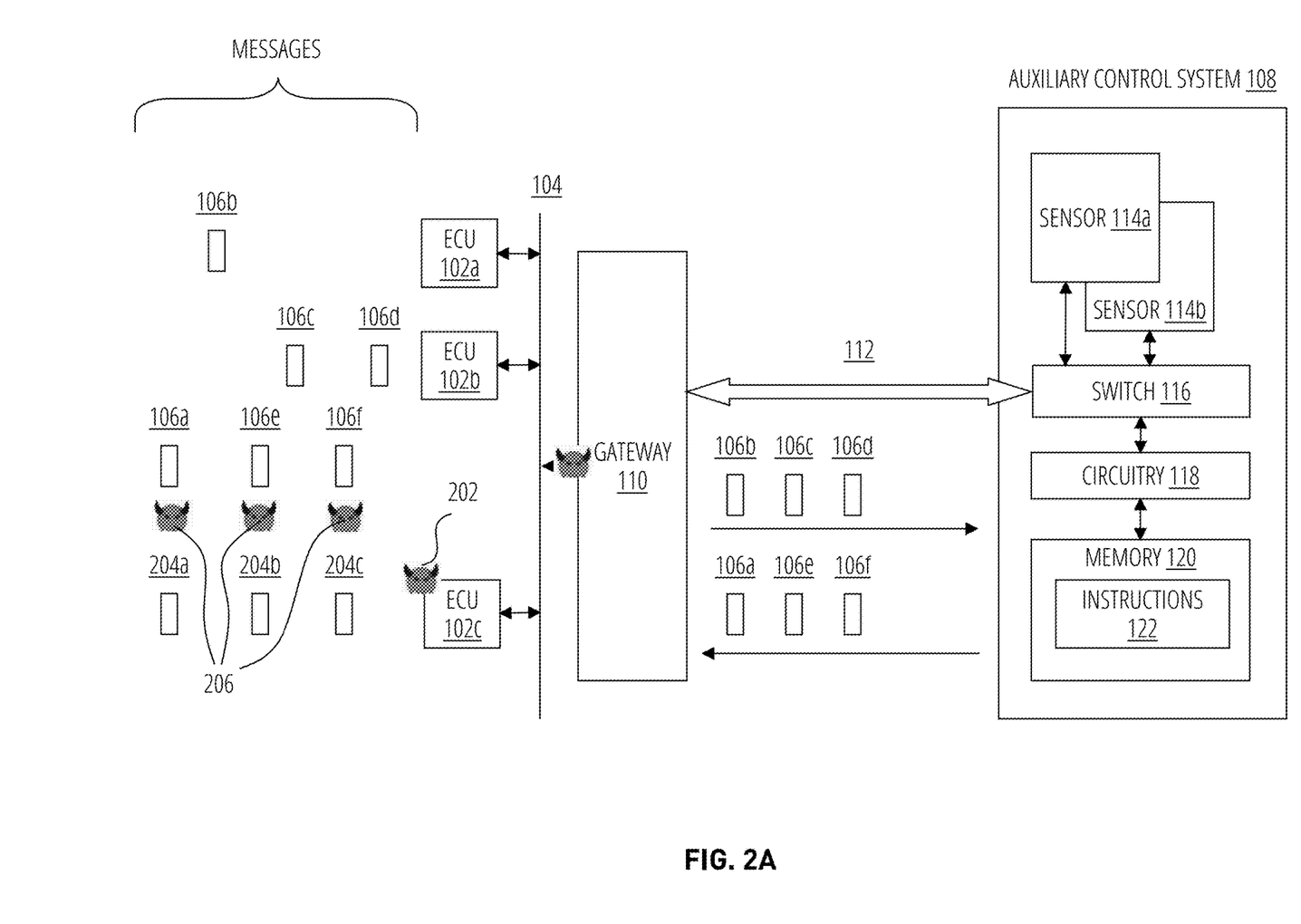
FIG. 2A illustrates an aspect of the subject matter in accordance with one embodiment.

FIG. 2A illustrates an example bus-off attack using the system 100 of FIG. 1. In particular, this figure depicts ECU 102c as a malicious actor 202, which can inject messages 204a, 204b, and 204c onto communication bus 104. In some examples, ECU 102c can inject messages 204a, 204b, and 204c onto communication bus 104 in an attempt to cause controlled collisions 206 with messages 106a, 106e, and 106f. Where messages 204a, 204b, and 204c collide with messages 106a, 106e, and 106f as depicted in this figure, gateway 110 and auxiliary control system 108 will accumulate transmission errors and may disconnect from communication bus 104 based on the accumulation of transmission errors.

As outlined above, the present disclosure is directed towards mitigating risk of bus-off attacks where the victim does not have direct access to the communication bus, such as in the case for auxiliary control system 108 not having direct access to communication bus 104.

Figure 2B:
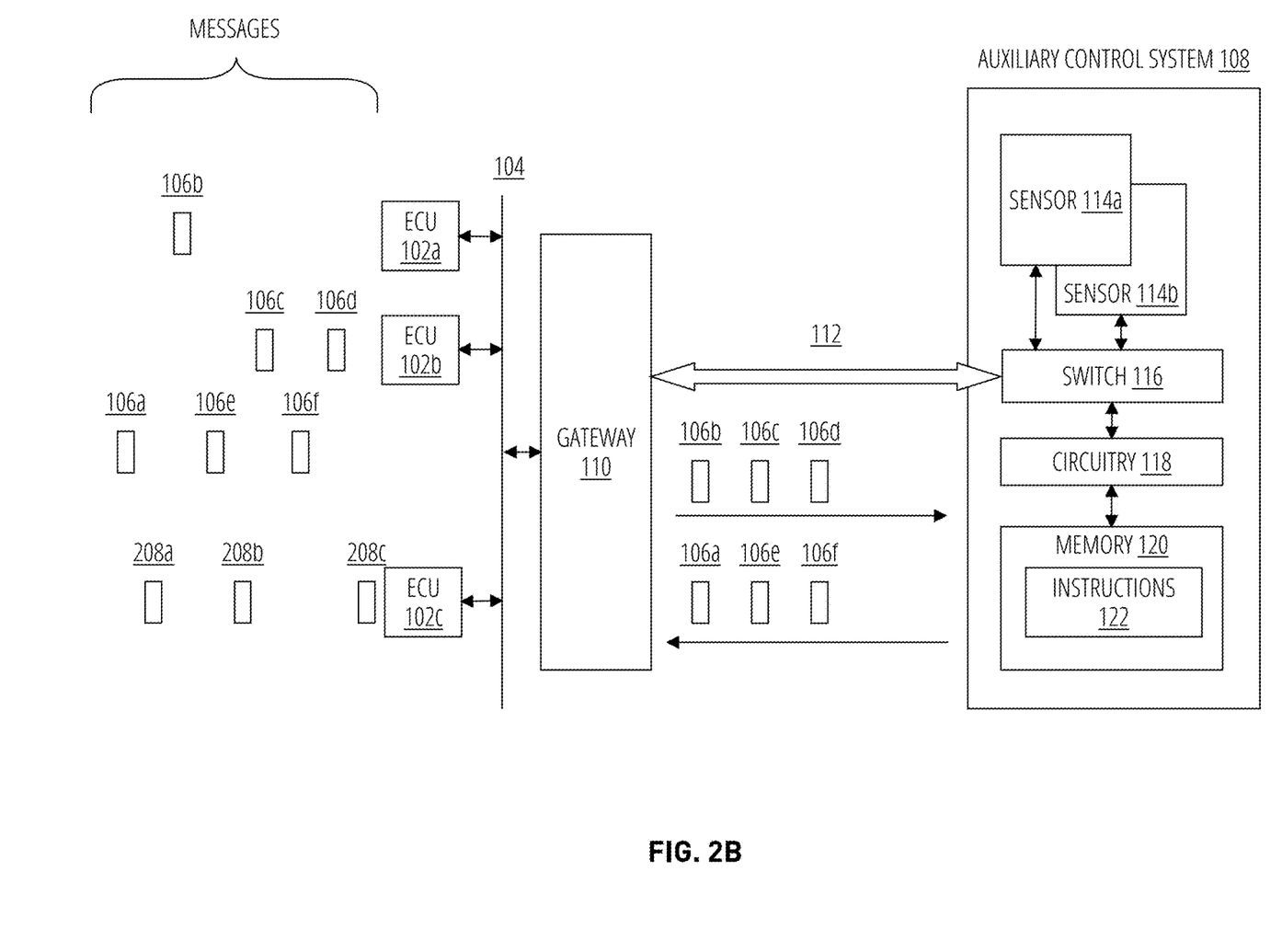
FIG. 2B illustrates an aspect of the subject matter in accordance with one embodiment.

Another type of attack with which ECUs of system 100 may be subject is a masquerading attack. FIG. 2B illustrates an example masquerading attack using the system 100 of FIG. 1. In particular, this figure depicts ECU 102c as a malicious actor that injects messages 208a, 208b, and 208c onto communication bus 104. In some examples, ECU 102c can inject messages 208a, 208b, and 208c onto communication bus 104 where the messages "masquerade" as being sent by another ECU of system 100 (e.g., ECU 102a, ECU 102b, or auxiliary control system 108). More particularly, ECU 102c can inject messages 208a, 208b, and 208c onto communication bus 104 where the messages masquerade as either sensed data from another ECU or component of system 100 (e.g., ECU 102a, ECU 102b, or auxiliary control system 108) or as actuation or control commands sent by another ECU or component of system 100 (e.g., ECU 102a, ECU 102b, or auxiliary control system 108). As a specific example, ECU 102c can inject messages (e.g., messages 208a, 208b, and/or 208c) onto communication bus 104 where the messages are actuation commands acting on behalf of the auxiliary control system 108. As another specific example, ECU 102c can inject messages (e.g., messages 208a, 208b, and/or 208c) onto communication bus 104 where the messages are data indicated as being sensed by auxiliary control system 108. In such examples, the malicious ECU (e.g., ECU 102c, or the like) can be considered as a masquerading ECU or as implementing a masquerading attack.

FIG. 2A and FIG. 2B illustrate ideal examples of a bus-off and masquerading attacks, respectively. For example, as depicted in FIG. 2A attack messages for a bus-off attack (e.g., messages 204a, 204b, and 204c) collide with all targeted messages (e.g., messages 106a, 106e, and 106f). However, in practice messages injected as part of a bus-off attack will not collide with all targeted messages. For example, misalignment between the injected message and the target message may occur due to a number of reasons.

Figure 3:
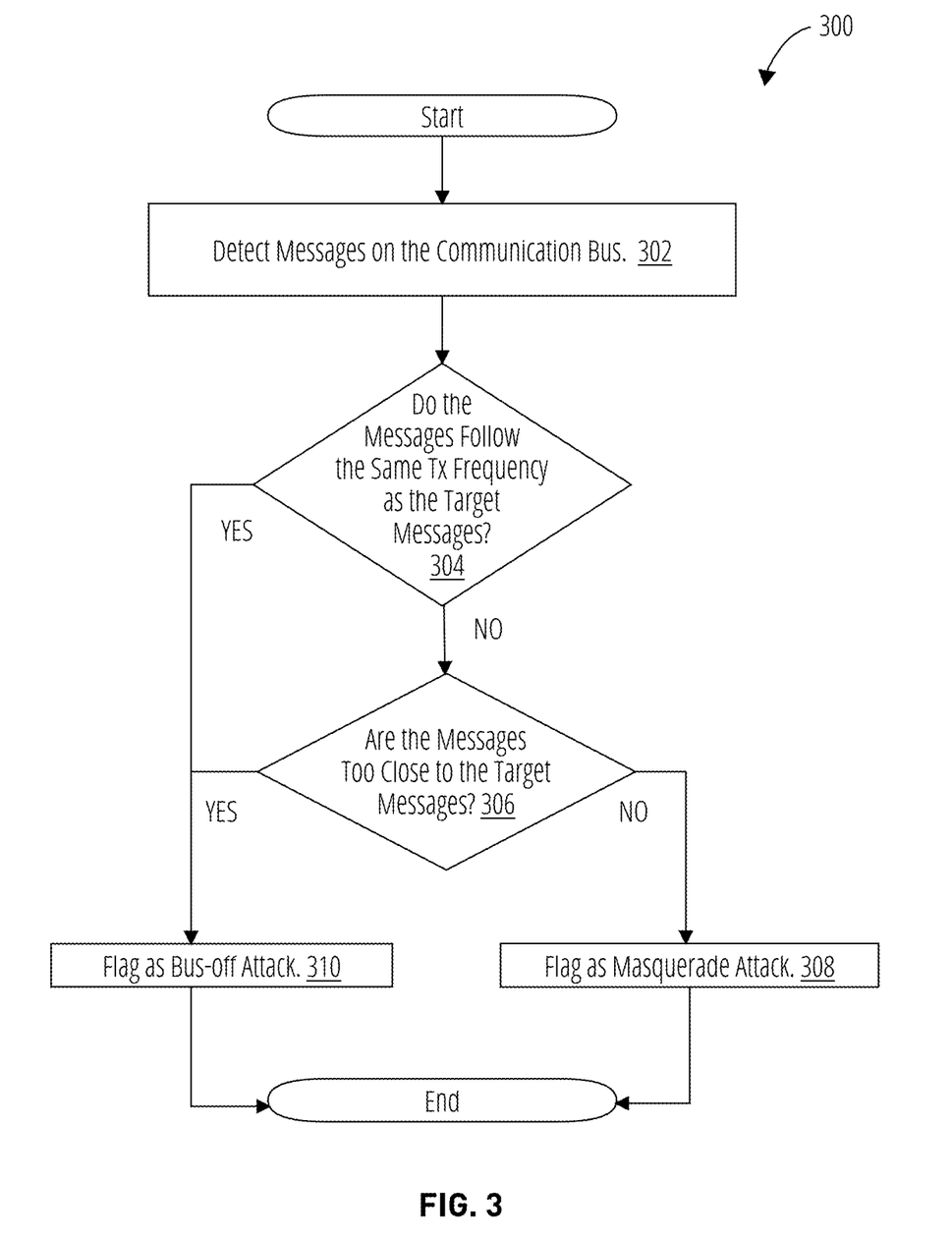
FIG. 3 illustrates a routine 300 to determine whether messages originated from the same ECU, in accordance with non-limiting example(s) of the present disclosure.

As noted, the present disclosure is directed towards mitigating risks of bus-off attacks. As such, it is important to distinguish between a bus-off attack and a masquerading attack. FIG. 3 depicts a routine 300. Routine 300 can be implemented by an intrusion detection system (IDS), such as may be implemented as part of auxiliary control system 108, to detect a bus-off attack or a masquerading attack. Often, routine 300 can be implemented as part of a larger routine provided by an IDS to protect and/or secure an ECU against malicious attacks. In the present disclosure, routine 300 can be implemented by an ECU with direct access to communication bus 104 (e.g., ECU 102a) or an ECU without direct access to communication bus 104 (e.g., auxiliary control system 108).

The routines and logic flows described herein, including routine 300, and other logic flows or routines described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Routine 300 can being at block 302 "detect messages on the communication bus" where an IDS can identify messages on a communication bus. For example, circuitry 118 can execute IDS instructions 124 to identify messages on communication bus 104 (e.g., via gateway 110, or the like). Continuing to decision block 304 "do the messages follow the same Tx frequency as target messages?" it is determined whether the messages identified at block 302 follow the same transmission frequency as target messages. For example, circuitry 118 can execute IDS instructions 124 to determine whether messages identified at block 302 follow the same transmission frequency as messages generated by auxiliary control system 108. More particularly, circuitry 118 can execute IDS instructions 124 to identify messages 204a, 204b, and 204c at block 302. Additionally, circuitry 118 can execute IDS instructions 124 to determine that these messages follow the same transmission frequency as messages 106a, 106b, and 106c. As another example, circuitry 118 can execute IDS instructions 124 to identify messages 208a, 208b, and 208c at block 302. Additionally, circuitry 118 can execute IDS instructions 124 to determine that these messages do not follow the same transmission frequency as messages 106a, 106b, and 106c.

From decision block 304, routine 300 can continue to either decision block 306 or block 310. In particular, routine 300 can continue from decision block 304 to decision block 306 based on a determination that the messages do not follow the same transmission frequency as the target messages while routine 300 can continue from decision block 304 to block 310 based on a determination that the messages do follow the same transmission frequency as the target messages.

At decision block 306 "are the messages too close to the target messages?" it is determined whether the messages identified at block 302 are transmitted within a threshold time from target messages. For example, circuitry 118 can execute IDS instructions 124 to determine whether messages identified at block 302 are transmitted within a threshold time from messages generated by auxiliary control system 108. It is to be appreciated that in an "ideal" bus-off attack all malicious messages will collide with target messages. However, in reality, some malicious messages will miss colliding with target messages. However, these malicious messages will be typically be transmitted within a threshold time from the target messages. From decision block 306, routine 300 can continue to either block 308 or block 310. In particular, routine 300 can continue from decision block 306 to block 308 based on a determination that the messages are not transmitted within the threshold distance from the target messages while routine 300 can continue from decision block 306 to block 310 based on a determination that the messages are transmitted within the threshold distance from the target messages.

It is noted that the phrase "too close" as used herein means that a threshold can be specified to determine whether the attacker's messages are "persistently close" or "consistently close" to the targeted ones. In particular, in the bus-off case, the attacker's messages will always be close to the targeted messages, while in the masquerade case, the messages can be more randomly spread out as the attacker is not trying to hit the target message, rather just inject new messages.

At block 308 "flag as masquerade attack" the identified messages can be flagged as a masquerade attack. For example, circuitry 118 can execute IDS instructions 124 to flag the messages identified at block 302 as messages associated with a masquerading attack. Similarly, at block 310 "flag as bus-off attack" the identified messages can be flagged as a bus-off attack. For example, circuitry 118 can execute IDS instructions 124 to flag the messages identified at block 302 as messages associated with a bus-off attack.

Figure 4:
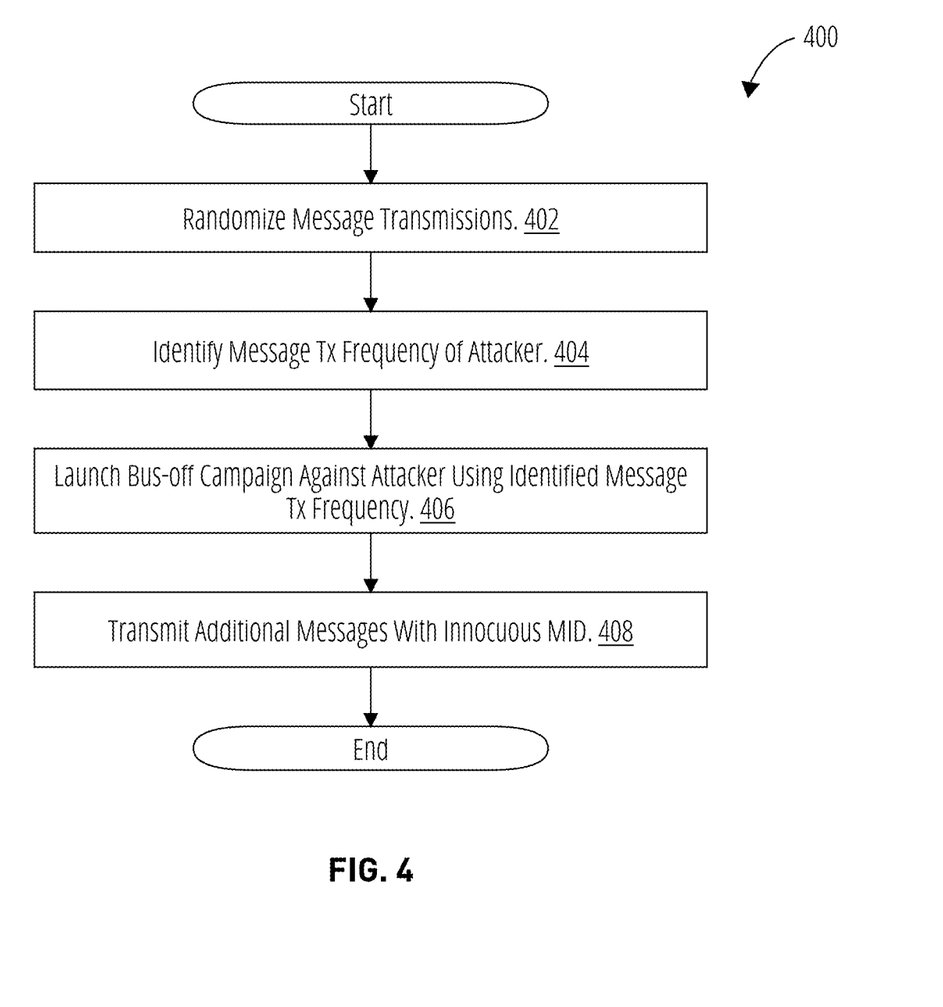
FIG. 4 illustrates a routine 400 to determine a mapping between ECUs and MIDs of messages transmitted on a communication bus, in accordance with non-limiting example(s) of the present disclosure.

FIG. 4 illustrates a routine 400 that can be implemented to mitigate risks of a bus-off attack. With some examples, routine 400 can be implemented by an IDS once the IDS identifies a bus-off attack. As a specific example, circuitry 118 can execute IDS instructions 124 to implement 400 after flagging messages as bus-off attack messages based on routine 300. Routine 400 can begin at block 402 "randomize message transmission" message transmissions can be randomized to make future collisions harder to for the attacker to coordinate. For example, circuitry 118 can execute IDS instructions 124 and/or instructions 122 to randomize the frequency with which messages are transmitted onto the communication bus 104.

Continuing to block 404 "identify message Tx frequency of attacker" the message transmission frequency of the attacker is identified. For example, circuitry 118 can execute IDS instructions 124 to identify the transmission frequency of ECU 102c and messages 204a, 204b, and 204c.

Continuing to block 406 "launch bus-off campaign against attacker using identified message Tx frequency" a bus-off campaign is launched against the attacker using the message transmission frequency identified at block 404. For example, circuitry 118 can execute instructions 122 and/or IDS instructions 124 to launch a bus-off campaign against ECU 102c using the transmission frequency of messages 204a, 204b, and 204c identified at block 406. In particular circuitry 118 can execute instructions 122 and/or IDS instructions 124 to generate messages for transmission onto communication bus 104 via gateway 110 with the intent that the generated messages will collide with messages generated by ECU 102c and force ECU 102c off the communication bus 104.

Continuing to block 408 "transmit additional messages with innocuous MID" additional messages with innocuous message identifiers (MIDs) can be generated and transmitted onto the communication bus. In particular, as will be appreciated where a bus-off attack is identified and a counter bus-off attack initiated against the attacker, a race to force accumulation of transmission errors in the other party occurs. As such, to minimize the number of accumulated errors, circuitry 118 can execute instructions 122 and/or IDS instructions 124 to generate additional messages with an innocuous MID and transmit these additional messages onto the communication bus 104. For example, many communication bus standards provide for a range of MIDs. As a specific example, the CAN bus standard provides a range and available MIDs with which ECUs can use to transmit messages. Furthermore, during operation, ECUs can observe the MIDs of messages being transmitted onto communication bus 104. As such, circuitry 118 can execute IDS instructions 124 to generate messages with randomized MIDs selected from MIDs from the space of potential MIDs that have not been observed on communication bus 104.

Figure 5:
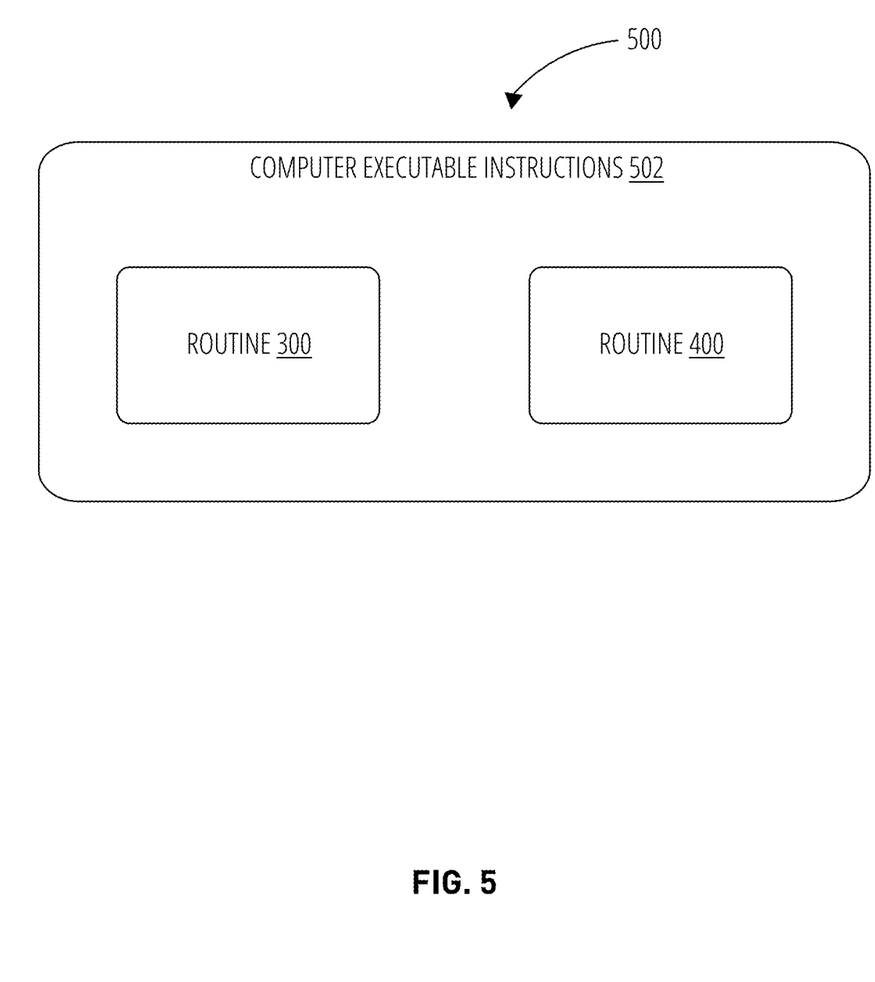
FIG. 5 illustrates a storage device 500 in accordance with one embodiment.

FIG. 5 illustrates an example of a storage device 500. Storage device 500 may comprise an article of manufacture, such as, any non-transitory computer readable medium or machine readable medium, such as an optical, magnetic or semiconductor storage. Storage device 500 may store various types of computer executable instructions 502, such as instructions to implement routine 300 and/or routine 400. Examples of a computer readable or machine readable storage medium may include any tangible media capable of storing electronic data, including volatile memory or non-volatile memory, removable or non-removable memory, erasable or non-erasable memory, writable or re-writable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
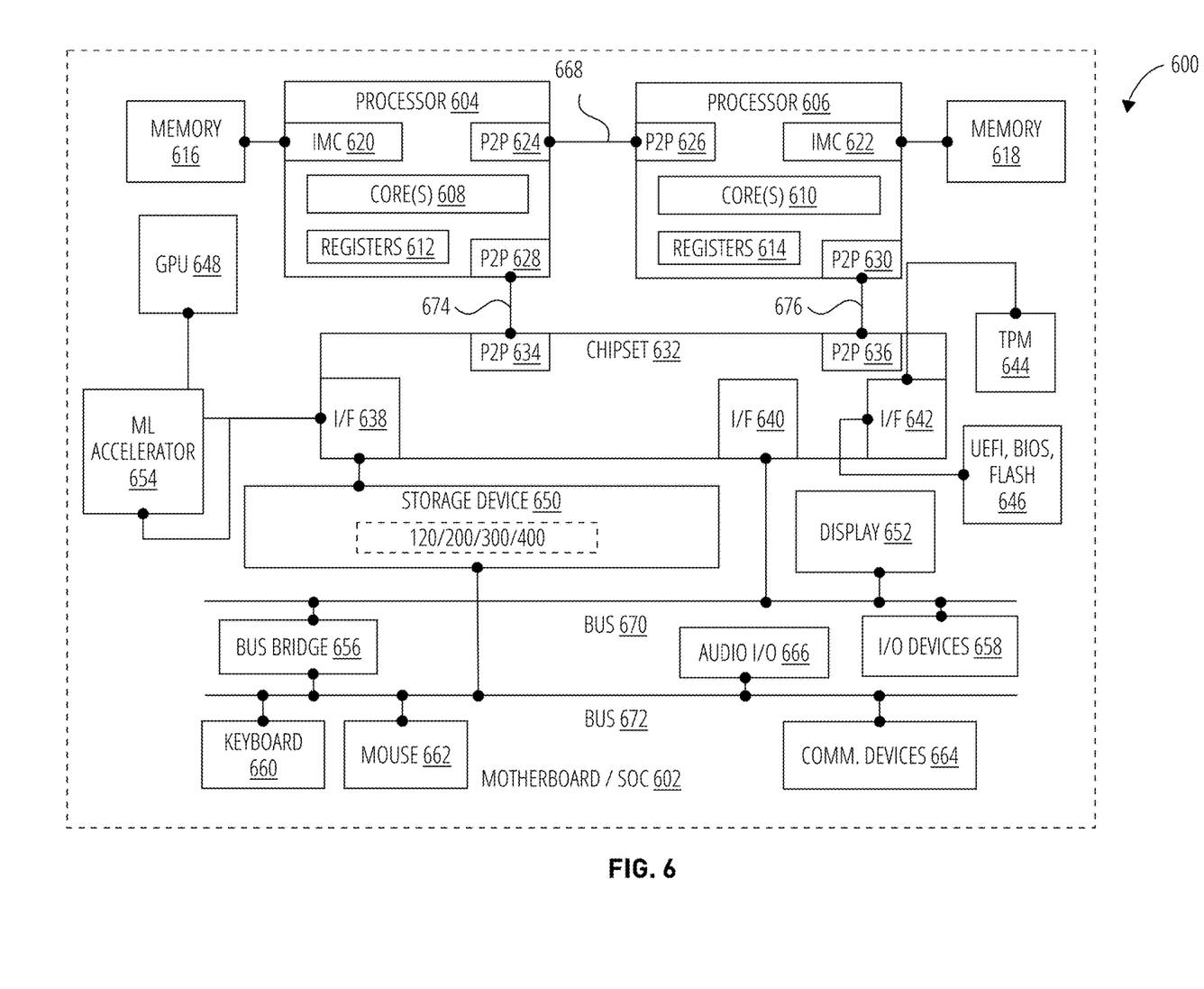
FIG. 6 illustrates a system 600, in accordance with non-limiting example(s) of the present disclosure.

FIG. 6 illustrates an embodiment of a system 600. System 600 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores. In at least one embodiment, the computing system 600 is representative of the components of the system 100. More generally, the computing system 600 is configured to implement all logic, systems, logic flows, methods, apparatuses, and functionality described herein. As a specific example, system 600 can be implemented as part of auxiliary control system 108 and arranged to implement the IDS feature of detecting bus-off and masquerading attacks and also mitigating against bus-off attacks as described herein.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip(SoC) 602 for mounting platform components. Motherboard or system-on-chip(SoC) 602 is a point-to-point (P2P) interconnect platform that includes a first processor 604 and a second processor 606 coupled via a point-to-point interconnect 668 such as an Ultra Path Interconnect (UPI). In other embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may include sockets to mount the processors and/or the chipset. Furthermore, some platforms may not have sockets (e.g. SoC, or the like).

The processor 604 and processor 606 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 604 and/or processor 606. Additionally, the processor 604 need not be identical to processor 606.

Processor 604 includes register registers 612, integrated memory controller (IMC) 620 and point-to-point (P2P) interface 624 and P2P interface 628. Similarly, the processor 606 includes register registers 614, IMC 622 as well as P2P interface 626 and P2P interface 630. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 616 and memory 618 locally attach to the respective processors (i.e., processor 604 and processor 606). In other embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e).

Processor 604 couples to a chipset 632 via P2P interface 628 and P2P 634 while processor 606 couples to a chipset 632 via P2P interface 630 and P2P 636. Direct media interface (DMI) 674 and DMI 676 may couple the P2P interface 628 and the P2P 634 and the P2P interface 630 and P2P 636, respectively. DMI 674 and DMI 676 may be a high-speed interconnect that facilitates, e.g., eight Giga Transfers per second (GT/s) such as DMI 3.0. In other embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In other embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632. Additionally, ML accelerator 654 coupled to chipset 632 via I/F 638. ML accelerator 654 can be circuitry arranged to execute ML related operations (e.g., training, inference, etc.) for ML models. In particular, ML accelerator 654 can be arranged to execute mathematical operations and/or operands useful for machine learning.

Various I/O devices 658 and display 652 couple to the bus 670, along with a bus bridge 656 which couples the bus 670 to a second bus 672 and an I/F 640 that connects the bus 670 with the chipset 632. In one embodiment, the second bus 672 may be a low pin count (LPC) bus. Various devices may couple to the second bus 672 including, for example, a keyboard 660, a mouse 662 and communication devices 664.

Furthermore, an audio I/O 666 may couple to second bus 672. Many of the I/O devices 658 and communication devices 664 may reside on the motherboard or system-on-chip (SoC) 602 while the keyboard 660 and the mouse 662 may be add-on peripherals. In other embodiments, some or all the I/O devices 658 and communication devices 664 are add-on peripherals and do not reside on the motherboard or system-on-chip (SoC) 602.

Figure 7:
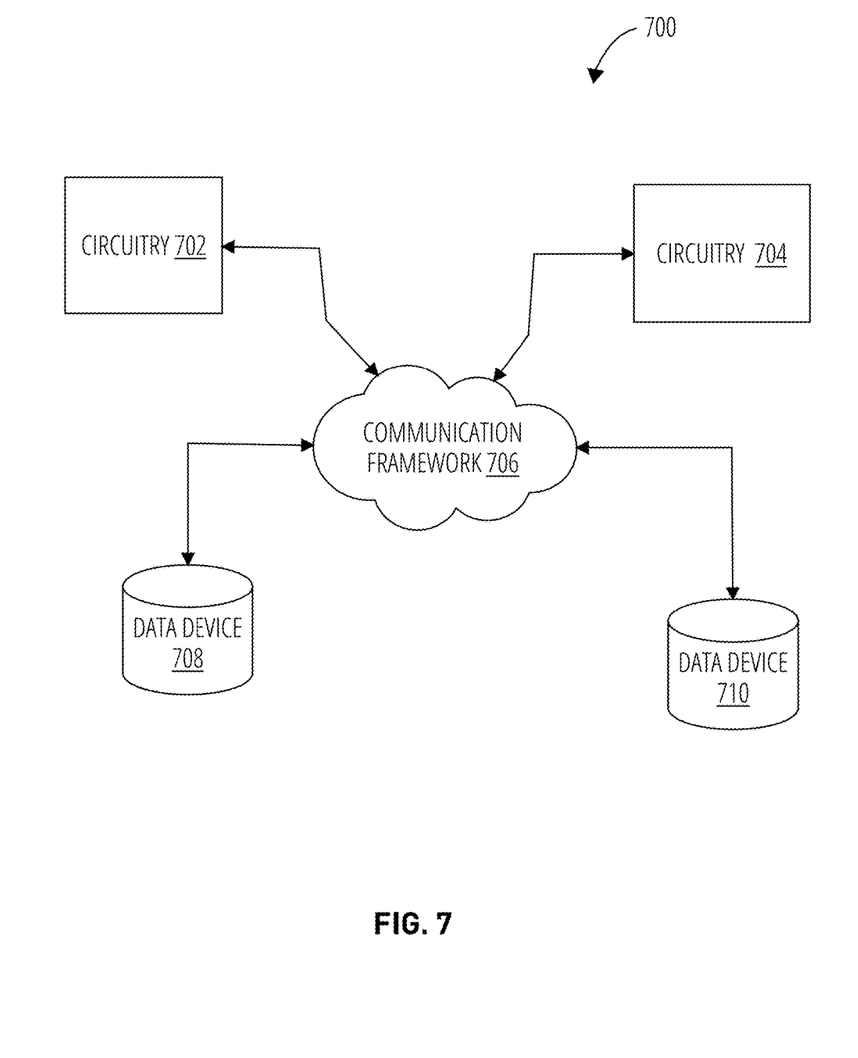
FIG. 7 illustrates an in-vehicle communication architecture 700 in accordance with one embodiment.

FIG. 7 illustrates an in-vehicle communication architecture 700 according to one or more embodiments of the disclosure. For example, one or more vehicular devices, components, or circuits, such as circuitry 702 and/or circuitry 704, may communicate with each other via a communication framework 706, which may be an in-vehicle network, such as a CAN bus, implemented to facilitate detecting bus-off and masquerading attacks as well as mitigating the affects of a bus-off attack.

The in-vehicle communication architecture 700 includes various common communications elements, such as a transmitter, receiver, transceiver, and so forth. The embodiments, however, are not limited to implementation by the in-vehicle communication architecture 700. As shown in this figure, the vehicular circuitry 702 and circuitry 704 may each be operatively connected to one or more respective data devices, such as, data device 708 and/or data device 710 that can be employed to store information local to the respective circuitry 702 and/or circuitry 704, such as fingerprints, distributions, densities, voltage signals, or the like. It may be understood that the circuitry 702 and circuitry 704 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 706 in a vehicle.

Further, the communication framework 706 may implement any well-known communications techniques and protocols. As described above, the communication framework 706 may be implemented as a CAN bus protocol or any other suitable in-vehicle communication protocol. The communication framework 706 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 706 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments have more features than are expressly recited in each claim. Rather, as the following claims reflect, the described subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1. A computing apparatus comprising: a processor; and memory storing instructions, which when executed by the processor configure the apparatus to: identify a first plurality of messages transmitted on a communication bus; determine whether the first plurality of messages have the same transmission frequency as a plurality of target messages, the plurality of target messages transmitted onto the communication bus by a target ECU; determine whether the first plurality of messages are transmitted within a threshold time from the plurality of target messages; and flag the first plurality of messages as messages associated with a bus-off attack against the target ECU based on a determination that the first plurality of messages have the same transmission frequency as the plurality of target messages and based on a determination that the first plurality of messages are transmitted within the threshold time from the plurality of target messages; or flag the first plurality of messages as messages associated with a masquerade attack against the target ECU based on a determination that the first plurality of messages do not have the same transmission frequency as the plurality of target messages; or flag the first plurality of messages as messages associated with a masquerade attack against the target ECU based on a determination that the first plurality of messages are not transmitted within the threshold time from the plurality of target messages.

Example 2. The computing apparatus of claim 1, the instructions when executed by the processor configure the apparatus to flag a first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

Example 3. The computing apparatus of claim 2, the instructions when executed by the processor configure the apparatus to: identify a transmission frequency of messages transmitted by the first ECU; and initiate a bus-off campaign against the first ECU.

Example 4. The computing apparatus of claim 3, the instructions when executed by the processor configure the apparatus to: generate a plurality of bus-off messages; cause, based on the transmission frequency, the plurality of bus-off messages to be transmitted onto the communication bus to collide with messages transmitted onto the communication bus by the first ECU.

Example 5. The computing apparatus of claim 1, the instructions when executed by the processor configure the apparatus to randomize a frequency at which messages are caused to be transmitted onto the communication bus by the target ECU.

Example 6. The computing apparatus of claim 1, the instructions when executed by the processor configure the apparatus to: generate the plurality of target messages; and cause the plurality of target messages to be transmitted onto the communication bus by the target ECU.

Example 7. The computing apparatus of claim 6, the instructions when executed by the processor configure the apparatus to: generate a plurality of additional messages, the plurality of additional messages having a different message identifier than the plurality of target messages; and cause the plurality of additional messages to be transmitted onto the communication bus.

Example 8. The computing apparatus of claim 1, wherein the communication bus is an in-vehicle (IVN) network, the processor coupled to the IVN via a gateway.

Example 9. A method, comprising: identifying a first plurality of messages transmitted on a communication bus; determining whether the first plurality of messages have the same transmission frequency as a plurality of target messages, the plurality of target messages transmitted onto the communication bus by a target ECU; determining whether the first plurality of messages are transmitted within a threshold time from the plurality of target messages; and flagging the first plurality of messages as messages associated with a bus-off attack against the target ECU based on a determination that the first plurality of messages have the same transmission frequency as the plurality of target messages and based on a determination that the first plurality of messages are transmitted within the threshold time from the plurality of target messages; or flagging the first plurality of messages as messages associated with a masquerade attack against the target ECU based on a determination that the first plurality of messages do not have the same transmission frequency as the plurality of target messages; or flagging the first plurality of messages as messages associated with a masquerade attack against the target ECU based on a determination that the first plurality of messages are not transmitted within the threshold time from the plurality of target messages.

Example 10. The method of claim 9, comprising flagging a first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

Example 11. The method of claim 10, comprising: identifying a transmission frequency of messages transmitted by the first ECU; and initiating a bus-off campaign against the first ECU.

Example 12. The method of claim 11, comprising: generating a plurality of bus-off messages; causing, based on the transmission frequency, the plurality of bus-off messages to be transmitted onto the communication bus to collide with messages transmitted onto the communication bus by the first ECU.

Example 13. The method of claim 9, comprising randomizing a frequency at which messages are caused to be transmitted onto the communication bus by the target ECU.

Example 14. The method of claim 9, comprising: generating the plurality of target messages; and causing the plurality of target messages to be transmitted onto the communication bus by the target ECU.

Example 15. The method of claim 14, comprising: generating a plurality of additional messages, the plurality of additional messages having a different message identifier than the plurality of target messages; and causing the plurality of additional messages to be transmitted onto the communication bus.

Example 16. The method of claim 9, wherein the communication bus is an in-vehicle (IVN) network, the target ECU coupled to the IVN via a gateway.

Example 17. A non-transitory computer-readable storage medium, the computer-readable storage medium including instructions that when executed by a computer, cause the computer to: identify a first plurality of messages transmitted on a communication bus; determine whether the first plurality of messages have the same transmission frequency as a plurality of target messages, the plurality of target messages transmitted onto the communication bus by a target ECU; determine whether the first plurality of messages are transmitted within a threshold time from the plurality of target messages; and flag the first plurality of messages as messages associated with a bus-off attack against the target ECU based on a determination that the first plurality of messages have the same transmission frequency as the plurality of target messages and based on a determination that the first plurality of messages are transmitted within the threshold time from the plurality of target messages; or flag the first plurality of messages as messages associated with a masquerade attack against the target ECU based on a determination that the first plurality of messages do not have the same transmission frequency as the plurality of target messages; or flag the first plurality of messages as messages associated with a masquerade attack against the target ECU based on a determination that the first plurality of messages are not transmitted within the threshold time from the plurality of target messages.

Example 18. The computer-readable storage medium of claim 17, the computer-readable storage medium including instructions that when executed by the computer, cause the computer to flag a first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

Example 19. The computer-readable storage medium of claim 18, the computer-readable storage medium including instructions that when executed by the computer, cause the computer to: identify a transmission frequency of messages transmitted by the first ECU; and initiate a bus-off campaign against the first ECU.

Example 20. The computer-readable storage medium of claim 19, the computer-readable storage medium including instructions that when executed by the computer, cause the computer to: generate a plurality of bus-off messages; cause, based on the transmission frequency, the plurality of bus-off messages to be transmitted onto the communication bus to collide with messages transmitted onto the communication bus by the first ECU.

Example 21. The computer-readable storage medium of claim 17, the computer-readable storage medium including instructions that when executed by the computer, cause the computer to randomize a frequency at which messages are caused to be transmitted onto the communication bus by the target ECU.

Example 22. The computer-readable storage medium of claim 17, the computer-readable storage medium including instructions that when executed by the computer, cause the computer to: generate the plurality of target messages; and cause the plurality of target messages to be transmitted onto the communication bus by the target ECU.

Example 23. The computer-readable storage medium of claim 22, the computer-readable storage medium including instructions that when executed by the computer, cause the computer to: generate a plurality of additional messages, the plurality of additional messages having a different message identifier than the plurality of target messages; and cause the plurality of additional messages to be transmitted onto the communication bus.

Example 24. The computer-readable storage medium of claim 17, wherein the communication bus is an in-vehicle (IVN) network, the target ECU coupled to the IVN via a gateway.

Example 25. An apparatus, comprising: means for identifying a first plurality of messages transmitted on a communication bus; means for determining whether the first plurality of messages have the same transmission frequency as a plurality of target messages, the plurality of target messages transmitted onto the communication bus by a target ECU; means for determining whether the first plurality of messages are transmitted within a threshold time from the plurality of target messages; and means for flagging the first plurality of messages as messages associated with a bus-off attack against the target ECU based on a determination that the first plurality of messages have the same transmission frequency as the plurality of target messages and based on a determination that the first plurality of messages are transmitted within the threshold time from the plurality of target messages; or means for flagging the first plurality of messages as messages associated with a masquerade attack against the target ECU based on a determination that the first plurality of messages do not have the same transmission frequency as the plurality of target messages; or means for flagging the first plurality of messages as messages associated with a masquerade attack against the target ECU based on a determination that the first plurality of messages are not transmitted within the threshold time from the plurality of target messages.

Example 26. The apparatus of claim 25, comprising means for flagging a first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

Example 27. The apparatus of claim 26, comprising: means for identifying a transmission frequency of messages transmitted by the first ECU; and means for initiating a bus-off campaign against the first ECU.

Example 28. The apparatus of claim 27, comprising: means for generating a plurality of bus-off messages; means for causing, based on the transmission frequency, the plurality of bus-off messages to be transmitted onto the communication bus to collide with messages transmitted onto the communication bus by the first ECU.

Example 29. The apparatus of claim 25, comprising means for randomizing a frequency at which messages are caused to be transmitted onto the communication bus by the target ECU.

Example 30. The apparatus of claim 25, comprising: means for generating the plurality of target messages; and means for causing the plurality of target messages to be transmitted onto the communication bus by the target ECU.

Example 31. The apparatus of claim 30, comprising: means for generating a plurality of additional messages, the plurality of additional messages having a different message identifier than the plurality of target messages; and means for causing the plurality of additional messages to be transmitted onto the communication bus.

Example 32. The apparatus of claim 25, wherein the communication bus is an in-vehicle (IVN) network, the target ECU coupled to the IVN via a gateway.

What is claimed is:

1. A computing apparatus comprising:
   a processor; and
   memory storing instructions, which when executed by the processor configure the apparatus to:
   identify a first plurality of messages transmitted on a communication bus;
   determine whether the first plurality of messages have the same transmission frequency as a plurality of target messages, the plurality of target messages transmitted onto the communication bus by a target electronic control unit (ECU);
   determine whether the first plurality of messages are transmitted within a threshold time from the plurality of target messages;
   flag the first plurality of messages as messages associated with a bus-off attack by a first ECU against the target ECU based on a determination that the first plurality of messages have the same transmission frequency as the plurality of target messages and based on a determination that the first plurality of messages are transmitted within the threshold time from the plurality of target messages;
   identify the first ECU as a malicious actor that injected the first plurality of messages onto the communication bus to cause the bus-off attack against the target ECU; and
   cause, based on the transmission frequency, a plurality of bus-off messages to be transmitted on the communication bus to counter the bus-off attack to force the first ECU off the communication bus.

2. The computing apparatus of claim 1, the instructions when executed by the processor configure the apparatus to flag the first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

3. The computing apparatus of claim 2, the instructions when executed by the processor configure the apparatus to:
   identify a transmission frequency of messages transmitted by the first ECU; and
   initiate a bus-off campaign against the first ECU.

4. The computing apparatus of claim 3, the instructions when executed by the processor configure the apparatus to:
   generate the plurality of bus-off messages;
   cause, based on the transmission frequency, the plurality of bus-off messages to be transmitted onto the communication bus to collide with messages transmitted onto the communication bus by the first ECU.

5. The computing apparatus of claim 1, the instructions when executed by the processor configure the apparatus to randomize a frequency at which messages are caused to be transmitted onto the communication bus by the target ECU.

6. The computing apparatus of claim 1, the instructions when executed by the processor configure the apparatus to:
generate the plurality of target messages; and
cause the plurality of target messages to be transmitted onto the communication bus by the target ECU.

7. The computing apparatus of claim 6, the instructions when executed by the processor configure the apparatus to:
generate a plurality of additional messages, the plurality of additional messages having a different message identifier than the plurality of target messages; and
cause the plurality of additional messages to be transmitted onto the communication bus.

8. The computing apparatus of claim 1, wherein the communication bus is an in-vehicle (IVN) network, the processor coupled to the IVN via a gateway.

9. A method, comprising:
identifying a first plurality of messages transmitted on a communication bus;
determining whether the first plurality of messages have the same transmission frequency as a plurality of target messages, the plurality of target messages transmitted onto the communication bus by a target electronic control unit (ECU);
determining whether the first plurality of messages are transmitted within a threshold time from the plurality of target messages;
flagging the first plurality of messages as messages associated with a bus-off attack by a first ECU against the target ECU based on a determination that the first plurality of messages have the same transmission frequency as the plurality of target messages and based on a determination that the first plurality of messages are transmitted within the threshold time from the plurality of target messages;
identifying the first ECU as a malicious actor that injected the first plurality of messages onto the communication bus to cause the bus-off attack against the target ECU; and
causing, based on the transmission frequency, a plurality of bus-off messages to be transmitted on the communication bus to counter the bus-off attack to force the first ECU off the communication bus.

10. The method of claim 9, comprising flagging the first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

11. The method of claim 10, comprising:
identifying a transmission frequency of messages transmitted by the first ECU; and
initiating a bus-off campaign against the first ECU.

12. The method of claim 11, comprising:
generating the plurality of bus-off messages;
causing, based on the transmission frequency, the plurality of bus-off messages to be transmitted onto the communication bus to collide with messages transmitted onto the communication bus by the first ECU.

13. The method of claim 9, comprising randomizing a frequency at which messages are caused to be transmitted onto the communication bus by the target ECU.

14. The method of claim 9, comprising:
generating the plurality of target messages; and
causing the plurality of target messages to be transmitted onto the communication bus by the target ECU.

15. The method of claim 14, comprising:
generating a plurality of additional messages, the plurality of additional messages having a different message identifier than the plurality of target messages; and
causing the plurality of additional messages to be transmitted onto the communication bus.

16. The method of claim 9, wherein the communication bus is an in-vehicle (IVN) network, the target ECU coupled to the IVN via a gateway.

17. A non-transitory computer-readable storage medium, the computer-readable storage medium including instructions that when executed by a computer, cause the computer to:
identify a first plurality of messages transmitted on a communication bus;
determine whether the first plurality of messages have the same transmission frequency as a plurality of target messages, the plurality of target messages transmitted onto the communication bus by a target electronic control unit (ECU);
determine whether the first plurality of messages are transmitted within a threshold time from the plurality of target messages;
flag the first plurality of messages as messages associated with a bus-off attack by a first ECU against the target ECU based on a determination that the first plurality of messages have the same transmission frequency as the plurality of target messages and based on a determination that the first plurality of messages are transmitted within the threshold time from the plurality of target messages;
identify the first ECU as a malicious actor that injected the first plurality of messages onto the communication bus to cause the bus-off attack against the target ECU; and
cause, based on the transmission frequency, a plurality of bus-off messages to be transmitted on the communication bus to counter the bus-off attack to force the first ECU off the communication bus.

18. The computer-readable storage medium of claim 17, the computer-readable storage medium including instructions that when executed by the computer, cause the computer to flag the first ECU as a malicious ECU based on determination that the first plurality of messages have the same transmission frequency as the plurality of target messages and based on a determination that the first plurality of messages are transmitted within the threshold time from the plurality of target messages, the first ECU associated with the first plurality of messages.

19. The computer-readable storage medium of claim 18, the computer-readable storage medium including instructions that when executed by the computer, cause the computer to:
identify a transmission frequency of messages transmitted by the first ECU; and
initiate a bus-off campaign against the first ECU.

20. The computer-readable storage medium of claim 19, the computer-readable storage medium including instructions that when executed by the computer, cause the computer to:
generate the plurality of bus-off messages;
cause, based on the transmission frequency, the plurality of bus-off messages to be transmitted onto the communication bus to collide with messages transmitted onto the communication bus by the first ECU.

21. The computer-readable storage medium of claim 17, the computer-readable storage medium including instructions that when executed by the computer, cause the computer to randomize a frequency at which messages are caused to be transmitted onto the communication bus by the target ECU.

22. The computer-readable storage medium of claim 17, the computer-readable storage medium including instructions that when executed by the computer, cause the computer to:
   generate the plurality of target messages; and
   cause the plurality of target messages to be transmitted onto the communication bus by the target ECU.

23. The computer-readable storage medium of claim 22, the computer-readable storage medium including instructions that when executed by the computer, cause the computer to:
   generate a plurality of additional messages, the plurality of additional messages having a different message identifier than the plurality of target messages; and
   cause the plurality of additional messages to be transmitted onto the communication bus.

24. The computer-readable storage medium of claim 17, wherein the communication bus is an in-vehicle (IVN) network, the target ECU coupled to the IVN via a gateway.

* * * * *